United States Patent [19]

Hönig et al.

[11] 4,356,447

[45] Oct. 26, 1982

[54] SYSTEM AND APPARATUS TO DETERMINE THE ANGULAR POSITION, AND SPEED OF A ROTATING SHAFT, PARTICULARLY CRANK SHAFT OF AN INTERNAL COMBUSTION ENGINE

[75] Inventors: Günter Hönig, Ludwigsburg; Uwe Kiencke, Ditzingen; Rainer Bone, Vaihingen, all of Fed. Rep. of Germany

[73] Assignee: Robert Bosch GmbH, Stuttgart, Fed. Rep. of Germany

[21] Appl. No.: 168,210

[22] Filed: Jul. 10, 1980

[30] Foreign Application Priority Data

Aug. 18, 1979 [DE] Fed. Rep. of Germany ....... 2933516

[51] Int. Cl.$^3$ .......................... G01P 3/48; G01P 3/54
[52] U.S. Cl. ................................. 324/169; 324/173; 324/392; 73/117.3; 364/565
[58] Field of Search ............... 324/169, 168, 392, 173, 324/174; 73/116, 117.3, 119 A; 364/565

[56] References Cited

U.S. PATENT DOCUMENTS

| | | | |
|---|---|---|---|
| 3,763,420 | 10/1973 | Maisonville | 324/169 X |
| 3,767,902 | 10/1973 | Estes et al. | 324/392 X |
| 3,883,795 | 5/1975 | Klein et al. | 324/392 |
| 4,036,190 | 7/1977 | Bigliani et al. | 324/392 X |
| 4,039,931 | 8/1977 | Schweizer | 324/392 |
| 4,095,179 | 6/1978 | Bremer et al. | 324/392 X |
| 4,166,976 | 9/1979 | Ruhnau et al. | 364/565 X |
| 4,262,251 | 4/1981 | Fujishiro et al. | 324/392 X |

*Primary Examiner*—Stanley T. Krawczewicz

[57] ABSTRACT

To positively allocate output signals from a transducer scanning marker elements arranged at a uniform distance from the center of a rotating disk, the markers are located around the circumference of the disk in accordance with a predetermined pattern, for example, uniformly distributed 30° apart, or distributed with uniformly increasing relative distances, and an additional market element (33) and forming a reference marker is located in the zones between adjacent markers spaced from a neighboring marker element (21) of the plurality of marker elements by a distance which is substantially larger than the angular distance with respect to the marker element at the other side of the reference marker. The outputs from a pick-up sensor are evaluated by applying the outputs to two counters, counting a different clock rate, the count output of one of the counters being stored and compared with a subsequent count state of the other counter operating at a higher clock rate. If the second counter has not reached the previously stored count, a positive indication that the sense marker as the reference marker is obtained, permitting a comparator to switch over a transfer switch to route the sensor output to a line indicating that the marker was the reference marker; if the faster-counting counter has, however, reached the count state of a slower counter in the prior cycle, an indication is obtained that the marker is a regularly recurring one, thus permitting control of the transfer of the output from the sensor to a routing line indicating that the marker is a regularly recurring one. The count rates are preferably sufficiently different to accomodate expected variations in speed of rotation of the disk within the recurrence time between adjacent markers.

9 Claims, 5 Drawing Figures

4,356,447

SYSTEM AND APPARATUS TO DETERMINE THE ANGULAR POSITION, AND SPEED OF A ROTATING SHAFT, PARTICULARLY CRANK SHAFT OF AN INTERNAL COMBUSTION ENGINE

The present invention relates to an apparatus to determine the angular position, and speed, of a rotating shaft, more particularly of a crank shaft of an internal combustion engine, and to a system utilizing the apparatus to evaluate output signals derived therefrom, and to positively identify a specific reference position.

BACKGROUND

Various types of transducer apparatus to determine the position and/or speed of a rotating shaft, for example, the crank shaft of an internal combustion (IC) engine are known. To determine the angular position of a multicylinder IC engine shaft, it is necessary to be able to associate a particular angular range with a particular cylinder. It has been proposed to utilize a disk in which marker elements, in the form of pins made of ferromagnetic material, are located. To determine a specific angular position, a reference marker can be placed on a disk at a radial distance which differs from the radial distance of other markers; or a separate disk can be used, which has only a single reference marker. As the markers pass associated sensing elements, pulses are induced therein. The pulses which are induced in the pickups associated with the reference markers, then, permit associating the pulses which are periodically induced in different pickups with specific cylinders. Such arrangements require additional sensors, that is, additional equipment to scan the reference markers.

The markers themselves can be electrical, electrooptical, inductive, or sensors which operate on other physical parameters.

The Invention

It is an object to provide a transducer, and a transducer-with-evaluation system which is easily made, and does not require separate pickups for a reference marker, and in which the difference between a reference marker and a normally positioned circumferential marker can be easily determined.

Briefly, a disk element is provided which is subdivided into a plurality of circumferential zones, at the end of which an angle position marker element is positioned. These zones, and the angle position marker elements, may, for example, be in the form of projecting tips, slots, or the like—in short, any type of marker element which can readily be sensed by a sensor, such as an inductive pickup, an optical transducer, or other element which senses a change in physical characteristics. The marker elements present steep flanks, or discontinuities to the pickup, so that the induced, or picked up pulse will be a sharp needle pulse type signal.

In accordance with the invention, and in order to provide a reference marker, an additional marker element is provided located in one of the subdivided zones between two angle position markers; the additional marker is spaced from one of the adjacent angle position markers by a distance which is large with respect to the distance from the other adjacent angle position marker.

In accordance with the preferred form of the invention, the disk has twelve angle position markers circumferentially distributed regularly at thirty degrees apart from each other. The additional reference marker is then located five degrees offset from one of the angle position markers. The width of the markers themselves may be a few degrees, the aforementioned angular relations being with reference to the center lines of the respective markers. The markers are equidistant from the center of the disk.

The evaluation circuit, which evaluates the output from the sensors includes two counters which are supplied with counting clock frequencies at different rates and which count during the interval from one marker pulse to the other. The counter states are compared in a comparator. If the count state of the higher frequency counting counter reaches the proceding count state of the lower frequency counter, a transfer switch switches the sensor pulse to a line indicating that the pulse is a regularly recurring one; if, however, the higher frequency counting counter does not reach this number when the lower frequency counting counter terminates its count, the transfer switch is controlled by the comparator to switch the respective output to a line indicating a marker pulse.

Ultilizing two counters of different counting rate permits unambiguous association of the reference markers, and the regular recurring angle position markers, respectively, to separate connecting lines, for subsequent use in subsequent equipment. The apparatus operates digitally, with the advantage of digital evaluation, that is, essentially immunity to stray or spurious impulses, and variations of supply or operating voltages, which may occur in separated integral networks, for example, the on board networks and automotive vehicles. The system is easy to make, the disk is readily manufactured, with high accuracy, while specific adjustment of different sensors with respect to different markers is avoided.

DRAWINGS

A disk S, for example of sheet metal is located on a shaft W, which, for example, is the crank shaft of an internal combustion engine, is coupled to rotate therewith. The disk S is subdivided into twelve zones 1-12. The zones are obtained by punching-out of marginal portions at the circumference, separated from each other by twenty seven degrees, leaving projecting angle position marker elements 21-32, spaced center-to-center thirty degrees apart, and edge-to-edge twenty seven degrees apart. The projections 21-32 form narrow rectangular teeth, each of an angular width of three degrees.

One of the ranges or zones of the disk should be identified for association with a specific cyclinder, for example, the first cylinder of an IC engine. In order to permit identification of this shaft position, an additional projection or tooth 33, which forms a reference marker tooth is provided. Tooth 33 is offset from tooth 32 by a distance of five degrees (center-to-center), so that the distance of projection or tooth 33 from tooth 21 will be twenty five degrees. Subdividing the disk into thirty-degree subdivisions has the substantial advantage that the disk has essentially universal application in all symetrical IC engines, and can even be used with non-symetrical V6 IC engines. It requires only a simple unipolar evaluation circuit. Teeth 21-33 have radial spacing r.

Figure 1:
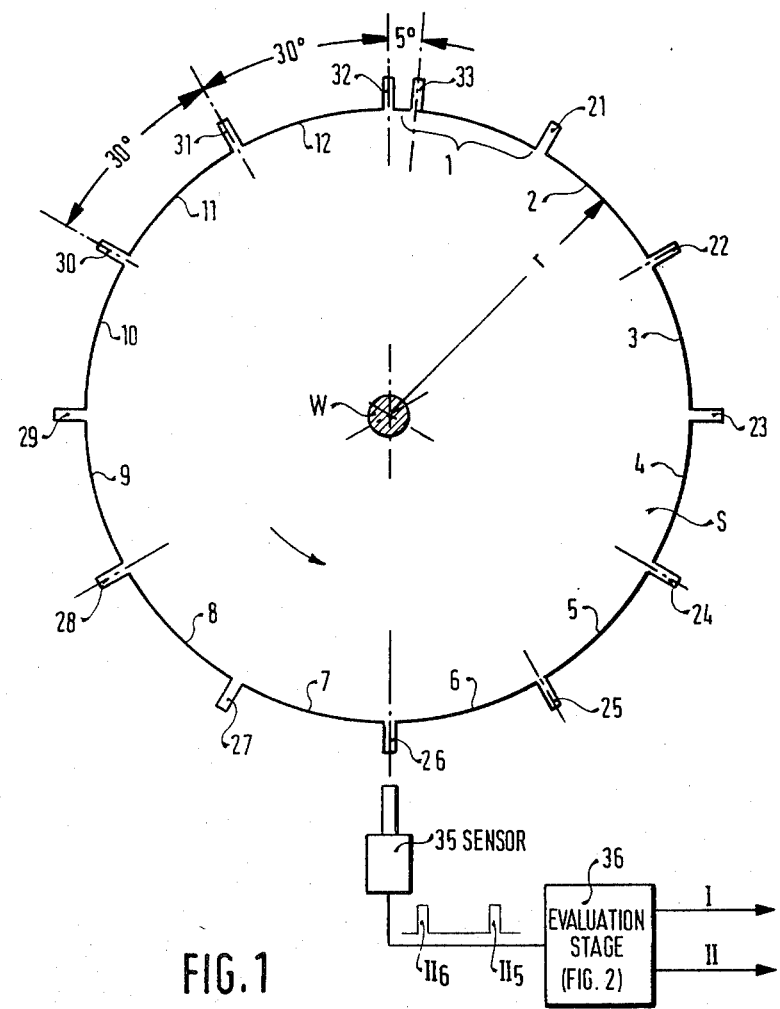
FIG. 1 is a highly schematic plan view of a sensor disk made, for example, of thin sheet metal and a highly schematic diagram of an evaluation system.

An inductive sensor 35 is positioned in sensing relation to the disk S which, each time that a tooth passes the sensor, generates a pulse II. Thus, the sensor will generate a series of pulses IIn. FIG. 1 illustrates the sensor being positioned opposite tooth 26, generating pulse $II_6$. The preceding pulse generated by tooth 25 is likewise shown as pulse $II_5$ in FIG. 1.

Let it be assumed that the rotary speed of the disk S is uniform. The sensor pulses IIn generated by teeth 21-32 thus will follow with uniform sequence at periods pn. Only the tooth 33, forming the reference marker or reference tooth will generate a sensing pulse $I_1$ which, in comparison to the preceding duration or period, follows shortly after the sensor pulse $II_{12}$.

An evaluation circuit 36 receives the sensor pulses in order to distinguish between the recurrence rate of the regularly positioned teeth 21-32, and the tooth 33, so that a particular piston position of one of the cyclinders of an IC engine can be used to generate, for example, an ignition spark, a fuel injection pulse or the like. This pulse should be separated from the remaining sensing pulses IIn. The respective output pulses IIn are then connected to an output line II, and a single marker pulse 33 is connected to appear at an output line I.

Figure 2:
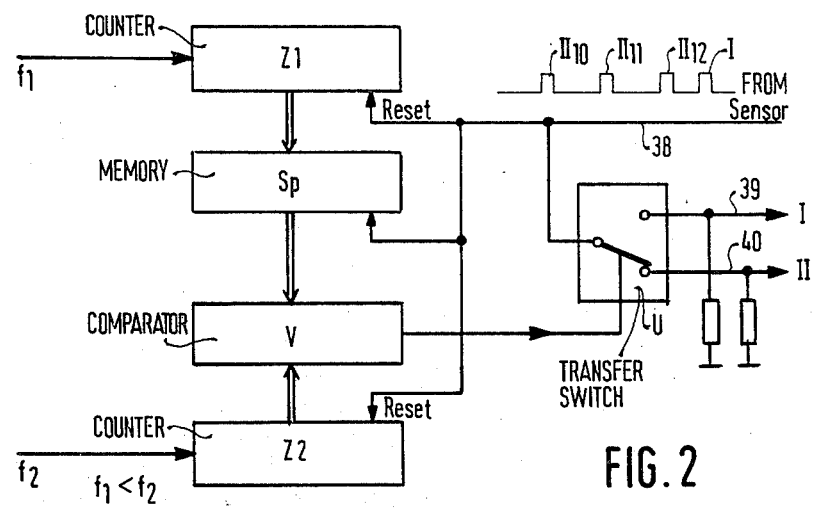
FIG. 2 is a schematic diagram of an evaluation system illustrated in block form in FIG. 1.
Figure 3:
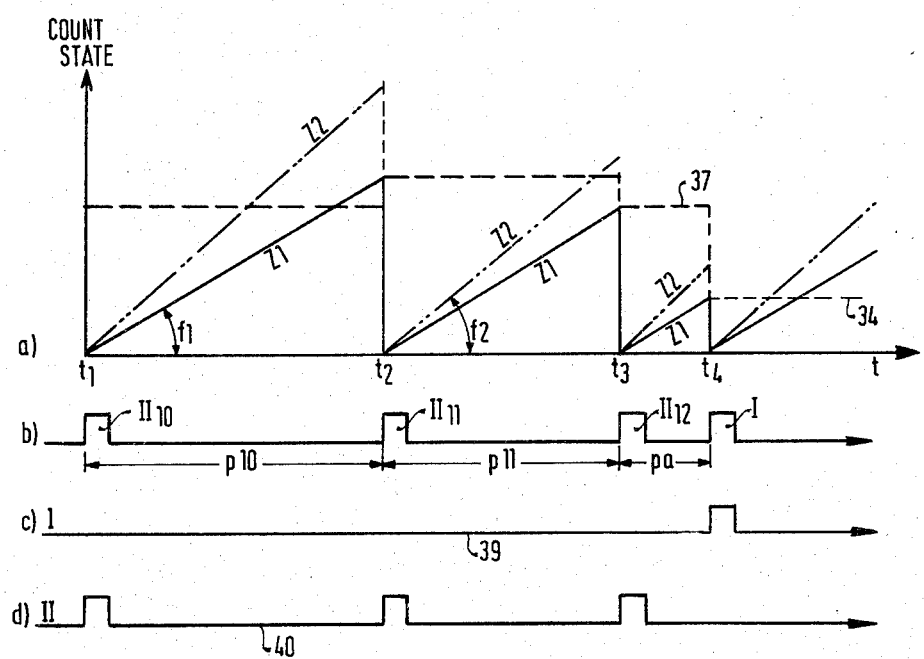
FIG. 3 is a series of time graphs or diagrams illustrating the operation of the system of FIG. 2.

The evaluation circuit—see FIG. 2—comprises two counters Z1, Z2, a memory Sp, a comparator V, and a transfer switch U. The two counters are connected to count during the period between two control pulses from the sensor, that is, to count the respective duration of the period p. The frequencies at which the counters count are $f_1$ for counter Z1, and $f_2$ for counter Z2, in which the clock or count frequency $f_1$ applied to the counter Z1 is less, and preferably substantially less then the clock or count frequency $f_2$ for the counter Z2. FIG. 3 illustrates the time period p10, between the sensor pulses $II_{10}$ and $II_{11}$. Due to the lower counting frequency, the count state of the first counter rises less. The count state of the first counter Z1 is shown in solid lines of FIG. 3, with the count state being indicated on the ordinate of the top graph a of FIG. 3. The count state of the counter Z2 is shown in double chain dotted lines. The count state of the counter Z1, upon reset at the next pulse from the sensor, is simultaneously transfered into the memory Sp which, also, cancels the previous memory state.

Operation

At time $t_1$, the memory Sp has stored therein the count state of the preceding count level, as indicated by the horizontal broken line in graph a of FIG. 3. The count state of the counters $Z_1$, $Z_2$ increase as shown, respectively, by the solid and double chain broken lines Z1, Z2. Upon occurrence of the next sensor pulse $II_{11}$ at time $t_2$, the content of the counter Z1 is transferred to the memory Sp, and the counter reset to zero. The memory, thus, stores this count state for one pulse period, and will remain constant for the next time period p11 starting at time $t_2$. As in the illustration, and to show the handling and distinguishing capability of the circuit, count period p11 is selected to be twenty percent less than the count period p10, that means, that the speed of the shaft W rose by twenty percent as the shaft turned over only about thirty degrees. During this shorter period p11, the counter Z1 no longer reached its storage value. This, however, does not change the operation since the content of the second counter Z2 has already passed the content of the preceding count in the memory at the time $t_3$. Consequently, the comparator, which compares the count state in the counter Z1 of the preceding cycle and of the counter Z2 in the then current cycle will control the transfer switch U to be in the solid line position as shown, that is, in the example given to maintain the switch to transfer signals from the sensor on line 38 to the output line II.

The reference marker I is offset with respect to the tooth 32 only by a small angular distance. Thus, the sensor pulse $II_{12}$ must be separated from the remaining sensor pulses. This is done at the time period starting at time $t_3$, and terminating at time $t_4$, during which time counting will proceed by both counters $Z_2$ and $Z_1$. The counter $Z_2$ does not reach the count state stored in the memory Sp, as shown in broken line 37, graph a, FIG. 3. If the counter $Z_2$, as the termination of its count, that is, upon reset does not reach the stored state in the memory, the comparator V will provide the change-over signal to cause the transfer switch to change to the position connecting line 38 with output I, that is, with output line 39. The counter $Z_2$, of course, will reach the next stored count state indicated by the line 34 well in advance of the next time period $p_1$ I, causing the comparator to provide an output signal to the transfer switch U to change over to the line 34, providing the output pulses II.

Figure 4:
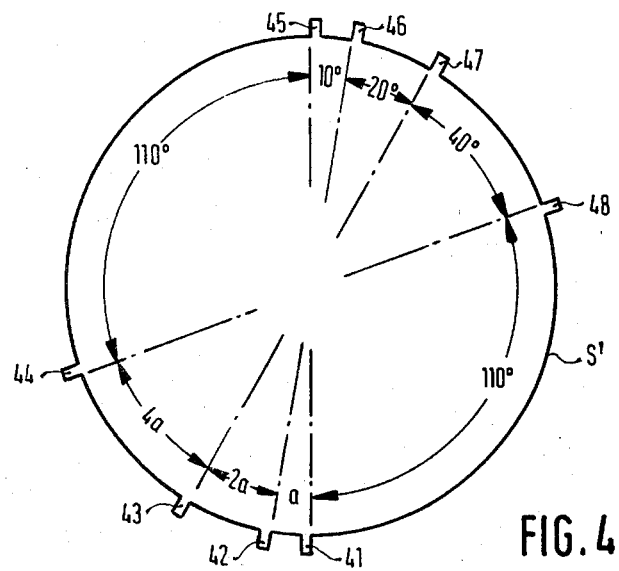
FIG. 4 is a plan view of a disk illustrating another embodiment of the invention.
Figure 5:
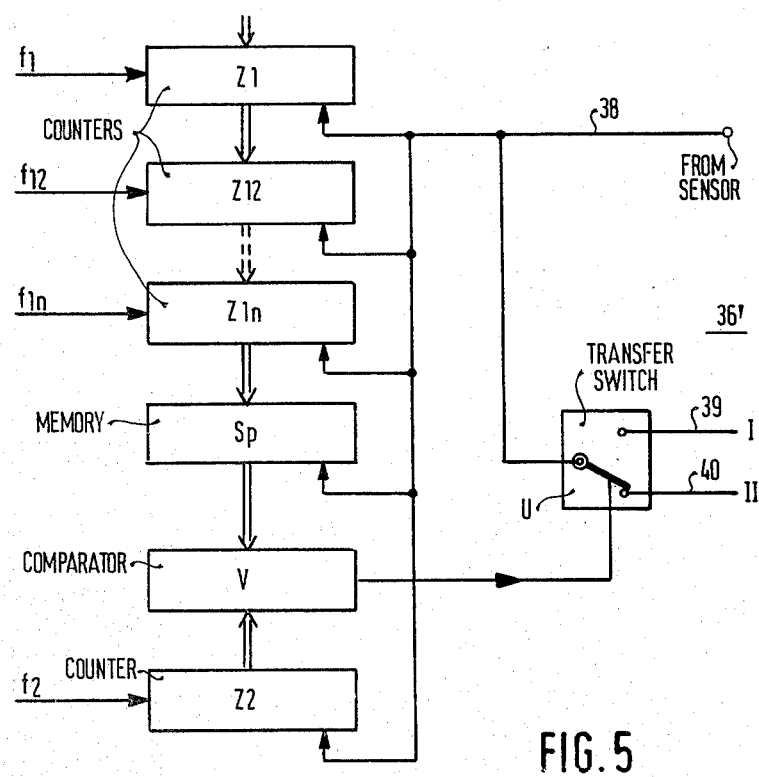
FIG. 5 is a highly schematic block diagram of a evaluation system for use with the disk of FIG. 4.

Embodiment of FIG. 4

A disk S' is shown which has four teeth 41, 42, 43, 44, each offset by angles a, 2a and 4a of ten, twenty and forty degrees respectively, and in which each of the teeth control a particular operating function of an IC Engine. Offset by one hundred and eighty degrees, are additional teeth 45, 46, 47 again separated from each other by similar distances, a=ten degrees in the example selected. The distance between two teeth 48 and 41, and 44 and 45 is one hundred and ten degrees, the teeth 41, 45 being separated by one hundred eighty degrees, respectively. In the disk illustrated, the associated functions repeat upon each half rotation of the disk S'.

The respective teeth 41, 42, 43, 44 and their mirror image 45-48 are evaluated in an evaluation circuit 36' which includes a plurality of counters Z1, Z12, Z1n which, each, have respective clock frequencies $f_1$, $f_{12}$, $f_{1n}$ applied thereto and connected to, respectively transfer and store the count states in the memory Sp. The memory Sp, as in the example of FIG. 2, is connected to a comparator V which compares the count state of a preceding count during the scanned angular range with the count state of counter Z2, having a frequency $f_2$ applied. Frequency $f_2$ must be higher than the sum of the count frequencies $f_1$ $f_{12}$, $f_n$. The transfer switch U changes to the reference marker output line 39 if the count state of the counter Z2 is below the value of the count state stored in memory Sp. Markers 42, 46 can then be positively identified. Another subdivision would be a respective angular change of a=twelve degrees, in which the distances between the sequential markers increase, by doubling the distance between any preceding marker. The arrangement of FIG. 4 distinguishes between the groups of markers by the greater distance between the last one of the markers of one group and the first one of the markers of the next group, that is, by the larger distance between markers 44, 45 and 48, 41, and markers 45, 46 and 41, 42, for example.

Various change in modification clearly made in features described in connection with any one of the embodiments can be used with the other, within the scope of the inventive concept.

We claim:

1. Sensing system to determine angular position of a rotary shaft (W) having
 - a disk element (S,S') rotating with a shaft, the disk element being subdivided into a plurality of successive zones of equal radial distance (r) from the center of the disk, and separated from each other by a plurality of circumferentially positioned angle position marker elements (21–32; 41–47) separating said zones, which angle marker elements are narrow with respect to the circumferential extent of the zones and which are formed with abrupt flanks to result in sharp change of a physical parameter upon rotation of the disk past a fixed pick-up sensor (35)
 and comprising, in accordance with the invention
 an additional marker element (33) forming a reference marker located in at least one of the zones and between two angle position marker elements, the angular distance of said additional reference marker element to a first angle position neighboring marker element (21) at one side of said reference marker element being substantially larger than the angular distance to a second neighboring marker element (32) at the opposite side of said reference marker element (33);
 a fixed sensor (35) positioned in sensing relation to said disk element and sensing passing both the angle position marker element and the additional reference elements past the sensor upon rotation of the shaft and providing needle-pulse type output signals;
 two counters ($Z_1$, $Z_{12}$, $Z_{1n}$; $Z2$) connected to and controlled by the sensor to start counting upon receipt of an output signal from the sensor;
 means generating a first frequency ($f_1$), said first frequency being applied to the first counter as a counting clock frequency therefor;
 means generating a second frequency ($f_2$) which is higher than said first frequency ($f_1$), said second frequency being applied to the second counter as a counting clock frequency therefor;
 a memory ($S_p$) connected to the first counter ($Z_1$, $Z_{12}$, $Z_{1n}$) and receiving the count state thereof which said first counter has reached in the period of time from a preceding output signal;
 a comparator (V) connected to the memory ($S_p$) and to said second counter ($Z_2$) and comparing whether the count state of the second counter, counting at the higher frequency, has a value which is greater, or less than the value stored in the memory;
 and a transfer switch, operated by the comparator to route the signal from the sensor (35)
 (a) to a first output line (39) indicative of a marker pulse if the comparator determines that the count state of the second counter, ($Z_2$) upon termination of its counting period due to occurrence of a subsequent output signal from the sensor, has not reached the count state stored in the memory based on the preceding stored count state derived from the first lower frequency counter; and,
 (b) to a second output line (40) if the count state of the second counter ($Z2$) reaches the count state stored in the memory ($S_p$) based on the preceding stored count state derived from the first, lower frequency counter.

2. System according to claim 1, wherein the disk (S') has groups of essentially symetrically positioned marker elements at its circumference, and in which the distance between successive marker elements, in the direction of rotation of the disk, increases successively.

3. System according to claim 2, wherein the rate of increase of the distance between the marker elements doubles approximately between adjacent disks.

4. System according to claim 1, wherein the plurality of angle position marker elements are essentially uniformly distributed about the circumference of the disk.

5. System according to claim 4, wherein the angle position marker elements are spaced apart approximately thirty degrees from each other—with respect to the center lines of the angle position marker elements; and
 the reference marker element (33) is positioned by an angular distance of approximately five degrees from the next adjacent one of the plurality of angle position marker elements.

6. System according to claim 1 wherein the marker elements have a circumferential width of between 2°–5°.

7. System according to claim 6, wherein the marker elements have a circumferential width of about 3°.

8. System according to claim 1, wherein the plurality of marker elements are separated from each other by 30°.

9. System according to claim 8, wherein the reference marker element (33) is positioned by an angular distance of approximately 5° from the next adjacent one of the plurality of marker elements.

* * * * *

UNITED STATES PATENT AND TRADEMARK OFFICE
CERTIFICATE OF CORRECTION

PATENT NO.  : 4,356,447
DATED       : October 26, 1982
INVENTOR(S) : Gunter HONIG et al It is certified that error appears in the above—identified patent and that said Letters Patent is hereby corrected as shown below:

Claim 3, Line 3 (Column 6),

Change "adjacent disks" to read -- adjacent marker elements --

Signed and Sealed this

Twenty-second Day of February 1983

[SEAL]

Attest:

GERALD J. MOSSINGHOFF

Attesting Officer   Commissioner of Patents and Trademarks